Nov. 26, 1946.  H. G. MORNER  2,411,743
FLUID PRESSURE MOLDING APPARATUS
Filed Sept. 20, 1944  2 Sheets-Sheet 1
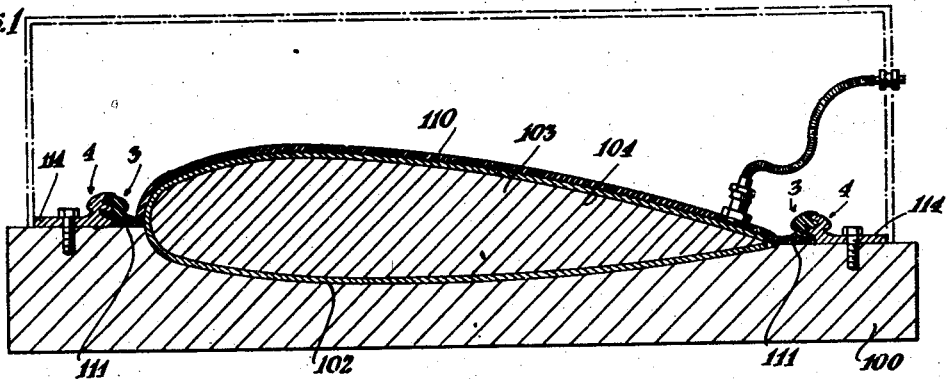
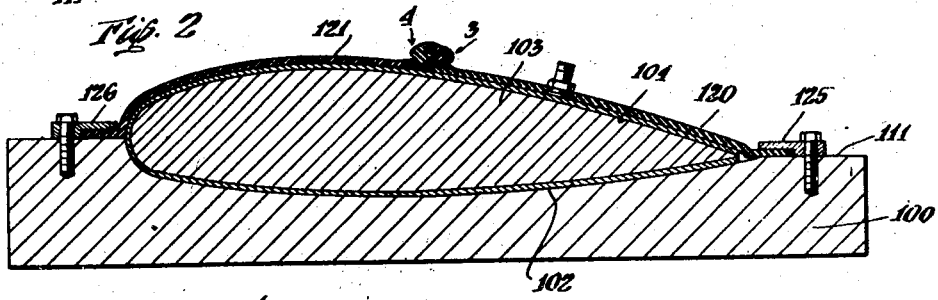
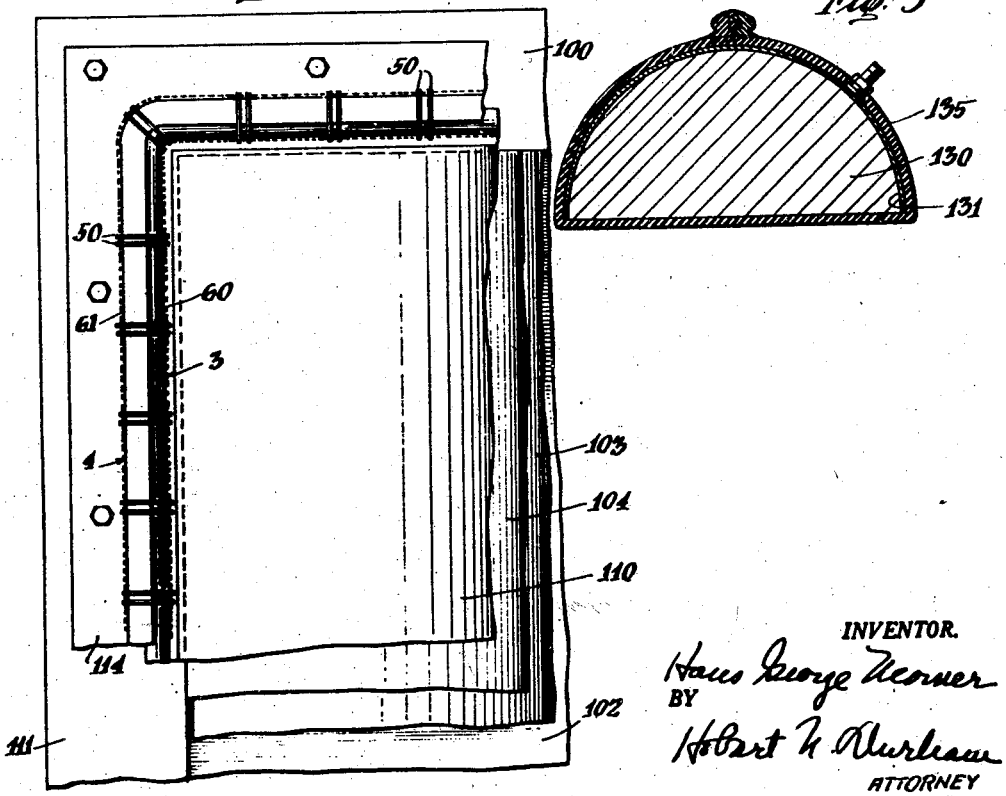
INVENTOR.
Hans George Morner
BY
Hobart H. Durham
ATTORNEY

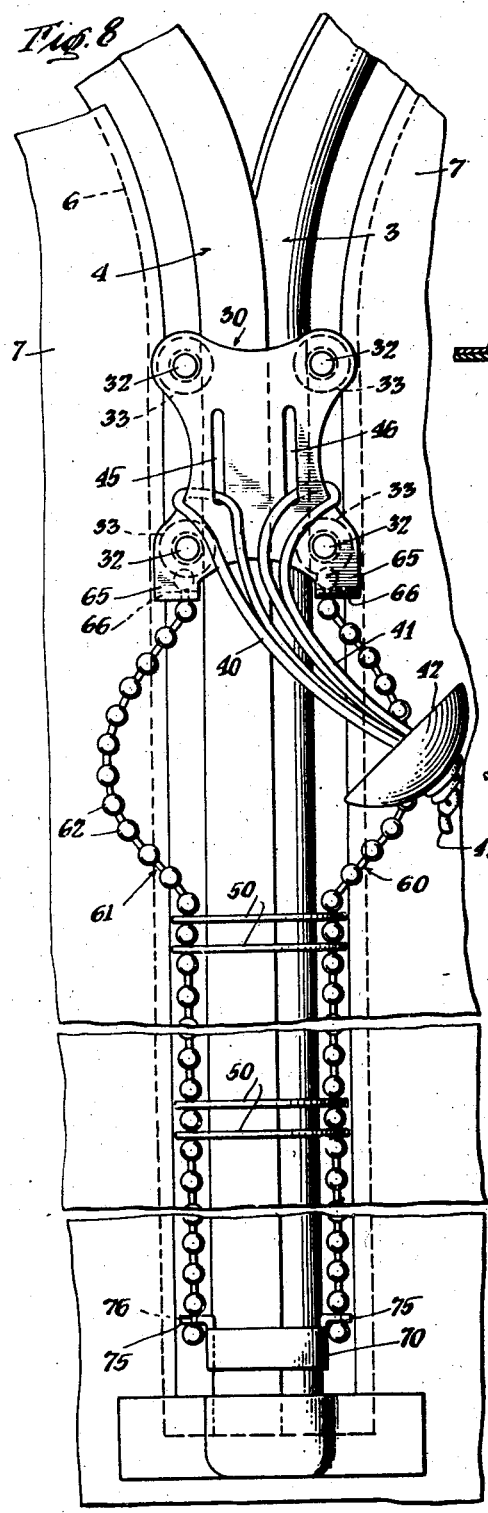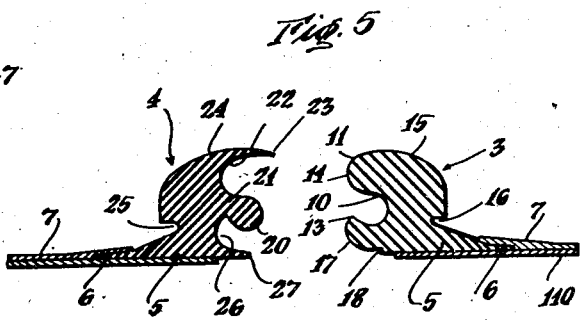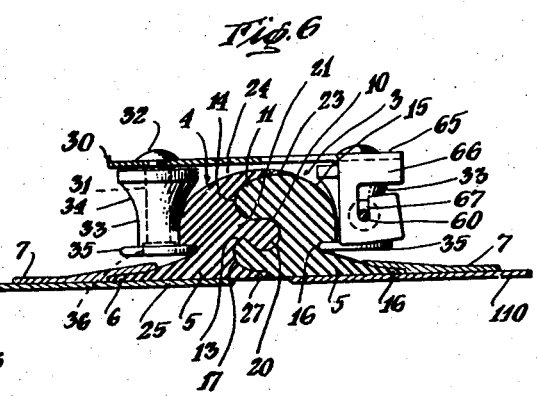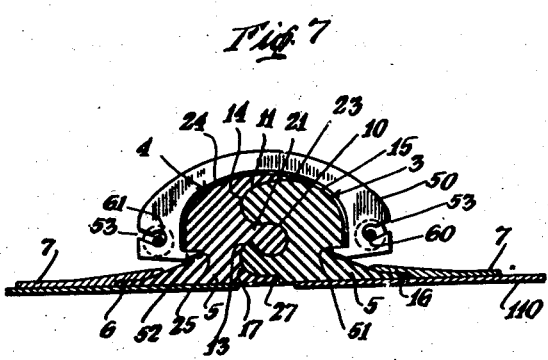

Patented Nov. 26, 1946

2,411,743

UNITED STATES PATENT OFFICE 2,411,743

FLUID PRESSURE MOLDING APPARATUS

Hans G. Morner, New York, N. Y.

Application September 20, 1944, Serial No. 554,921

2 Claims. (Cl. 144—281)

The invention relates to apparatus for molding articles and more particularly to new and useful means for molding plastic-bonded plywood or other plastic-bonded sheet material by fluid pressure.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a transverse section of a mold equipped with devices embodying the invention;

Fig. 2 is a similar view of a modified form;

Fig. 3 is a similar view of another modification;

Fig. 4 is a fragmentary plan view of the mold shown in Fig. 1;

Figs. 5, 6 and 7 are enlarged cross-sectional details of a form of fastening device used with the invention; and Fig. 8 is an enlarged fragmentary plan view showing the fastener in place.

The invention is directed to providing new and improved means for closing the flexible casings or bags utilized in the molding of plastic-bonded plywood, veneer or other fabric or plicated material when same is molded into various shapes and articles by means of fluid pressure applied through a flexible membrane which lies between the source of fluid pressure and the article being molded. The invention is applicable, for example, to the method of molding disclosed in the patent to E. L. Vidal et al., No. 2,276,004, dated March 10, 1942, but it will be understood that the invention is not limited to the particular process and apparatus disclosed in said patent, but may be applied generally to molding operations and apparatus of the type broadly referred to above.

In such molding operations it is common to lay or place the veneers or other plies of material, inter-larded with thermo-plastic or thermo-setting resin, against the surface of the male or female mold and then encase the mold and material to be molded within a flexible membrane such as a rubber bag. The bag is then preferably exhausted so as to bring the membrane thereof into intimate contact with the material to be molded, it being most desirable to avoid air pockets and lack of contact throughout the surface. This operation has heretofore involved considerable difficulty in fitting the bag to the mold and material. The bag has necessarily required a large mouth or opening to enable it to be drawn over the mold and material, especially where the articles to be molded constitute large objects such as the wing or fuselage of an airplane. The matter of encasing or sheathing the mold and article in the bag has been a difficult and awkward operation and the necessarily loose fit obtained by the use of a bag having an opening large enough to encase such objects has led to looseness in the ultimate fit and the use of an undesirably large amount of extra material. In order to put the bag about the mold and article it has been necessary to drag, pull and stretch the bag along, under and over the same. Also it is difficult to wrap the bag or parts thereof about the mold and articles to insure complete coverage.

Moreover, great difficulty has been encountered in effecting a complete closure and seal of the bag about the mold and article in order to proceed with the molding operation. The molding operation entails application of fluid pressure and heat to the exterior of the bag while permitting the interior thereof to exhaust to atmosphere or a lower pressure zone, all as more fully disclosed in said Vidal et al. patent, for example. Where the bag is not tightly closed, heat and moisture penetrate such closures and frequently impair or loosen the mold or the article being molded or bonded. Similarly, where a close and accurate fit between the bag and the enclosed article is not obtained, the heat and pressure sometimes cause the poorly fitted portion of the bag to stretch across depressed surfaces in the enclosed article and thus weaken or break the bag at such point, causing destruction of the bag and of the articles therewithin.

Objects of the invention are to provide devices for improving the fit of bags or membranes in such molding operations; and to provide completely fluid-tight closures thereof which can be quickly and efficiently closed and opened throughout the entire length or breadth of the mold. These features of the invention permit rapid insertion and withdrawal of the articles being molded; avoid the necessity for overlapping and wrapping bags or layers thereof about such articles and molds; permit the shaping of the bag to the mold and article so that a close and accurate fit is obtained automatically upon closure. The invention also leads to great economy in the amount of rubber or other fabric used for the bag membrane and also avoids breakage or rupture of such membranes through handling and application of heat and pressure and otherwise.

The invention broadly comprises the application to such molding bags or membranes of a flexible slide fastener or closure such as that shown and described, for example, in my Patent No. 2,355,816, dated August 15, 1944. Such closure, being made of rubber or other flexible material, can be formed integrally with the edges of the bag or membrane it is desired to close and, because of its flexible nature, the closure will conform exactly to the shape to be taken by the bag or membrane against the mold and article within it. Because of the fact that such closure can be of indefinite length, the opening of the bag can be made throughout its length or breadth or both, thereby permitting same to be laid fully open for the easy insertion of the material to be molded within the mold (female) or readily brought around the exterior of a male mold, as the case may be.

It will be understood that the foregoing general description and the following detailed description as well are exemplary and explanatory but are not restrictive of the invention.

Referring now to the present preferred embodiment illustrated by way of example in the accompanying drawings, there is shown diagrammatically in Fig. 1 a form of mold 100 for shaping or molding part of the surface of an airfoil or aircraft wing, for example. This mold may be similar in principle to those shown in Vidal Patent No. 2,276,004, British Patent 443,696 to Groves, and the like, and it is understood that the detailed construction of said mold and the part to be molded thereon constitute no part of the present invention and are here shown as suggestive and illustrative only of the principle of the present invention. Said mold comprises the generally rectangular base or block 100 having the concave portion 102 forming the lower surface and tail and nose curves of the wing. A male mold block 103 may be seated within said outer mold 102 and upon said male mold there will be laid strips of veneer 104 which are suitably coated or impregnated with thermo-responsive plastic material which acts under heat and pressure to bond and integrate and mold together the various layers of veneer or other fabric material being so molded.

In accordance with the invention, the molds 100 and 103 and the article 104 to be molded are all encased within a fluid-tight membrane or casing which, as shown, comprises the overlying rubber blanket 110, the edges of which lie upon the plane border surfaces 111 of the mold block 100. The peripheral edge of said blanket 110 is provided with a beaded closure member 3 formed of rubber or other flexible material, which member is preferably shaped and constructed as shown and described in detail in my Patent No. 2,355,816. Said member preferably extends along the entire periphery of the blanket 110 and when said blanket is laid in the mold-covering position shown in Fig. 1, said closure member 3 is adapted to be engaged with the mating closure member 4 which is fastened to the plane border surface 111 of the block 100. As shown, said mating closure member 4 is fastened to said border surface 111 of the block, being formed as an integral bordering part of a sheet 114 of rubber or other material, which sheet is permanently and hermetically bonded by plastic or other means to the plane surfaces 111. Thus it will be apparent that the closure members 3 and 4 may be drawn together by suitable slide fastening means so that the entire blanket 110 will be closed and sealed over and about the molds 100 and 103 and the enveloping article or material 104 to be molded.

The embodied means for effecting the slide-fastening closure comprises the two major flexible rubber bodies or strips 3 and 4 adapted to be operably engaged in interlocking longitudinal relationship. Each of said strips 3 and 4 extends throughout the length of the opening to be closed, is made of relatively thick but pliable and yieldable rubber, preferably of about the consistency of automobile tire rubber or slightly softer. Each of said strips is therefore inherently flexible throughout its length and thus is adapted to conform to the shape of the container or of the contents thereof. The strip 3 (Fig. 5) is formed as a solid rubber body having a flat base portion 5 which tapers to a relatively thin side edge portion or strip 6. The flat base 5 is adapted to be seated on and vulcanized to the outer surface of the membrane or blanket 110, while preferably an overlapping sealing strip 7 is contiguously sealed to the outer surface of membrane 110 and overlies the thinner portion 6 and is vulcanized thereto so as to form a strong and fluid-proof and flexible connection between the strip body 3 and the membrane 110. Similarly body strip member 4 is permanently sealed and fastened to the membrane 114 by similar parts as will be clear from the drawings.

The strip members 3 and 4 are adapted to be intermeshed and separably interlocked throughout their length and their adjacent surfaces are suitably formed for this purpose. As will appear from Figs. 5 and 6, the strip member 3 is the primary female member of the closure pair, its inner or meshing surface being formed with a groove or socket-like recess 10 which extends throughout the length of the member. The socket or groove 10 is formed by an upper node or ridge 11, the terminal edge of which is arcuate. A lower node or ridge underlies the socket 10 and curves outwardly and upwardly from the interior thereof to provide an upper terminal edge 13. Said edge 13 and the opposite and adjacent terminal edge 14 of the node 11 are spaced closer to each other than the maximum cross-sectional diameter of the socket 10 so that said socket has a mouth or entrance smaller in cross-section than its interior section. The upper surface of the node 11 is reversely curved at 15 to form a rounded top for the member 3 which continues in a substantially uniform arc around the surface thereof to form a re-entrant groove 16 along the back edge of the member 3 and at about the same level as the lower portion of the socket 10. The tapered upper surface of the base member 5 extends into the groove 16 as shown. The lower surface 17 of the lower node 12 curves downwardly and rearwardly to terminate at a slight shoulder 18 formed in the flat base of the portion 5.

The strip 4 constitutes the primary male member of the closure couple and its engaging or front face is provided throughout its length with protruding node 20 which is substantially circular in cross-section throughout about three-fourths of its cross-sectional circumference and is shaped and positioned so as to fit very tightly into the socket portion 10 of the member 3. The rear or neck portion 21 of the node 20 is narrower than the major diameter of the node and thus is adapted to conform to and fit tightly in the space between the edges 13 and 14 of the member 3.

The face of member 4 above the node 20 is re-entrantly grooved to form an arcuate socket 22 which is adapted to receive and intimately engage the node portion 11 of the member 3. The portion of the member 4 above the socket 22 is tapered to form an overlapping and relatively thin lip portion 23 which overlies the upper grooved surface 15 of the member 3 to a substantial extent. It will be noted that the terminal edge of the lip member 23 is in substantially the same vertical plane as the terminal edge of the node member 20. The upper surface of the lip portion 23 is rearwardly and downwardly curved in an arc 24 roughly corresponding in shape to that of the surface 15 of member 3 and being re-entrantly grooved at 25 along the rear edge of the member 4, which groove merges with the rising surface of the tapered base 5 so as to form a groove identical in shape with and at the same level as the groove 16 of the member 3 but facing in the opposite direction, as will be clear from the drawings.

The lower portion of the node 20 merges with a reversely curved grooved portion 26, the cross-sectional outline of which corresponds intimately with the node 12 of the member 3. Below the groove 26 the member 4 curves inwardly and downwardly to form the relatively thin and flexible lip portion 27, the base of which is co-extensive with the flat base of portion 5. The inner edge of lip 27 extends so as to underlie the curved surface 17 of the portion 12 of member 2 and abut against the shoulder 18 of member 3 when the strips are in their interlocked engagement, as will be clear from Figs. 6 and 7.

When the strips 3 and 4 are inter-engaged as described and shown, the central node portion 20 is tightly interlocked within the receiving socket 10 of the member 3. That is, it is necessary to force the member 20 into the socket 10 between the constricting jaws 13 and 14 of the latter, the resiliency of the rubber permitting this action. At the same time the lower node 12 and the upper node 11 of the member 3 are recessed in the sockets 26 and 22 respectively of the member 4 so that a firm union and interlocking closure is afforded by these parts. In addition, however, the overlapping relatively thin and pliable lip 23 embraces and overlies the entire joinder of the strips. This lip member therefore forms an effective seal to the entire closure or joint and, because of its thinness and relative pliability, it is adapted to be forced tightly against the upper surface 15 of member 3 when the closure is subjected to external fluid force during the molding operation. That is, the fluid pressure exerted against the surfaces of the container or blanket tends to compress and thereby tighten the closure of the entire joint and especially to force the overlying lip 23 tightly over and against the surface 15 and thereby effectively seal the entire joint. In a similar manner the underlying, relatively thin tapered lip 27 performs a like function for the lower portion of the closure as will be obvious from the foregoing taken in connection with the drawings.

It will be noted that the engagement of node 11 in the socket 22 and node 12 in socket 26 are relatively easily separated by transverse movement as there is little or no interlocking action at these surfaces, the only true interlock being between the socket 10 and the node 20. This construction therefore greatly facilitates the sliding engagement and disengagement of the strip members, while at the same time the sealing actions of the flexible lip members 23 and 27 provides a unique sealing function in combination with the main interlock as above described.

The invention provides means for joining and closing together the strips 3 and 4 of the closure of slide action and one important feature of the invention is the construction of slide means which will reduce to a minimum the friction and resistance to such closures under all conditions of use of the device, while at the same time providing the maximum of tightness and compression of the engaging parts of the closure strips so as to provide and maintain an exceedingly tight, and therefore effective, sealing closure. For this purpose a rolling and compressing action is preferably employed. As embodied the slide comprises a frame having a flat, generally rectangular metal base piece 30 which overlies and is spaced a short distance from the top of the outermost portion of the lip 23 of the strip member 4, said plate 30 thus lying parallel to the base 5 and the face of the membranes 1 and 2. Each of the four corners of the plate 30 is apertured to receive a vertically-disposed pin 31 having an enlarged head 32 the base of which lies flush against the top of the plate. Said pin extends downwardly from the plate a sufficient distance to serve as an axle or journal for a roller 33 which is rotatable thereon. Said roller has an upper cylindrical portion, the top of which underlies the bottom surface of the plate 30 and therebelow the surface of the roller is curved as shown in Fig. 6, said curvature being such that the roller is circular in cross-section throughout but of diminishing radius nearly to its bottom portion where it again flares to terminate in a circular hub 35. Said hub has a rounded edge of a thickness such that it fits intimately into the groove 25 of the strip member 4 (or groove 16 of strip member 3 as the case may be) while the rear curved portions 24 and 15 of the strip members 4 and 3 respectively fit generally into the curved surfaces 34 of the rollers. It will be understood that each of the rollers 33 at the four corners of the plate 30 is identical in construction and that each of them is rotatable on its respective axle pin 31 as shown. The lower ends of said axle pins 31 are enlarged at 36 to be seated in conforming recesses at the base 35 of the rollers and thereby act to rotatably support said rollers as shown.

As will be clear from the drawings, movement of the slide 30 lengthwise of the strips 3 and 4 will cause the rollers to rotate due to the frictional engagement thereof with the outer or rear edges 15 and 24 of the strips 3 and 4 respectively. The rollers thus exert a camming and squeezing action upon the strips to force them toward each other and into interlocking engagement as shown. The bottom hubs 35 of the rollers travel in the grooves 16 and 25 and thereby exert powerful clamping and compressing action upon the strips so as to cause the interlocking nodes 20 and 12 and their respective socket portions to be forced quickly and firmly together. Due to the seating of the hubs 35 in said grooves, the slide is at all times intimately engaged with the strips 3 and 4 wherever it may be located along them and merely by pulling it lengthwise along said strips it forces the unengaged strips together as stated and shown. It will be recognized that by the utilization of rolling friction, a relatively great compressive force can be exerted upon the strips while at the same time assuring easy operation of the slide along the strips under any and all conditions. Moreover the provision of four such rollers, as shown, tends to maintain the movement of the slide rectilinear and even as it travels along the strips, thereby preventing any possibility of jamming or tilting or twisting of the slide out of its desired trackway, while the multiple rollers distribute the rolling friction and thereby reduce the force required.

It will further be understood that movement of the slide in one direction will effect closure and inter-engagement of the strips 3 and 4. However, a reverse movement of the slide will not automatically separate the strips, but will merely make their separation possible by hand. Thus the closure of a bag, for instance, will remain water-tight until it is actually opened.

Means for facilitating sliding of the slide on the strips is provided and same is constructed so as to further reduce any possibility of the slide to tilt or assume an undesired angular position on the strips in either direction of movement therealong. As embodied a slide pull comprising a pair of looped cords 40 and 41 is provided, the ends of said cords being passed through a button or apertured handle member 42 and knotted at 43. The opposite ends of said cords are passed through longitudinal slides 45 and 46 respectively formed in the slide plate 30. Thus when it is desired to pull the slide upwardly to close the strips together, the cord loops will slide to the upper ends of the slots 45 and 46 and the pull will be exerted there substantially parallel to the plane of the slide 30 and the direction of desired movement. Conversely when it is desired to pull the slide downwardly in the opposite direction, the looped cords will slip to the bottom of the slots 45 and 46 and thus the pull will be exerted at the lower end of the slide and therefore more closely parallel to the desired plane of movement. In other words, no tilting action is imparted to the slide or carriage in either direction of movement thereof as would be the case if the point of application of the pulling force were fixed at the center or at either end of the slide. Hence binding or wedging of the slide on the strips is materially reduced by this feature of the invention.

The invention provides additional means for maintaining compact closure and security thereof throughout the length of the strips 3 and 4 over which the slide 30 has been moved in the closing direction. For this purpose a plurality of slide following members 50 are provided, said members being adapted to be drawn after the slide 30 and to maintain the compactness of closure which has been effected thereby. Said following members 50 are preferably substantially U-shaped pieces of flat metal, the interior curvature of which conforms substantially to the exterior outline of the curved portions 15 and 24 of the strips 3 and 4 when the latter are inter-engaged. Inwardly disposed tongues 51 and 52 are provided near the ends of the arms of the member 50 and extending into and travelling along the grooves 16 and 25 respectively, there acting to maintain the pressure and compacting force originally exerted by the hubs 35 of the rollers 33 of the slide.

Means are provided for drawing the followers 50 after the slide and for maintaining same in suitable spaced positions along the closed parts of the strips 3 and 4. As embodied each of the followers 50 is attached to flexible cords or chains along either side of the strips and as shown chains 60 and 61 are provided for this purpose. Said chains preferably comprise links separated by small beads 62. Each arm of the spacer member 50 is apertured by a slot 53 the outer portion of which is narrow and which is enlarged terminally to permit passage of the link portion 60 of the chain but is too small to admit passage of the bead members 62 thereof. Thus any pull on the chains in either direction will cause the follower members 50 to slide along the strips. The chains at one end are fixed to the slide plate 30, the lower ends 65 thereof being downwardly flanged at 66 to provide means for attachment of the ends of said chains. The flanged portions 66 are apertured at 67 in form similar to the apertures 53, there to receive the end link and bead of the chain as shown. Thus when the slide is pulled upwardly, it pulls the chains 60 and 61 along with it and in so doing causes the followers 50 to be pulled along the strips to take up their spaced positions along the taut chains. Preferably, the followers are provided in sets of pairs spaced by a single bead 62 thus providing a distribution of gripping action at each pair of said followers.

The bottom ends of the strips 3 and 4 are preferably maintained permanently interlocked together and for this purpose an arcuate or U-shaped band 70 is tightly gripped about the elevated portions of the strips as shown in Fig. 8. The terminal ends are tightly embedded into the grooves 16 and 25 respectively of the two strips so that said band 70 is tightly fixed and stationary near the lower ends of said strips. The bottom ends of the chains 60 and 61 are fixed to said band 70 by ears 75 which extend toward the sides of said band and are provided with appropriate openings 76 to receive and hold the ends of said chains as shown.

Thus in the embodiment described above, it will be seen that complete and rapid closure of the molds and article to be molded may be effected simply by laying the properly shaped blanket 110 thereover and sealing same to the mold block 100 by means of the slide fastener operation described above. Consequently the blanket 110 may be accordingly shaped to conform to the mold and article without any slack or wrinkles and without requiring any close setting or manipulation during or after the application thereof. At the same time the closure effected by the above-described means is fluid-tight even under the pressures and temperatures used for the molding operation so that no danger of leakage or rupture is involved.

Referring to the modification of the invention shown in Fig. 2, the mold block 100, the molds 102 and 103 and the article 104 to be molded are substantially the same as those shown in Fig. 1. However, with this form of the invention the closure members 3 and 4 are located along an intermediate line of the overlying blanket which comprises two separate pieces 120 and 121. The edges of the piece 120 are sealed to the upper border surface 111 of the mold block as by an overlying metal or other hermetic sealing member 125, while the similar edges of the piece 121 are similarly sealed by means 126. The closure members 3 and 4 may and preferably do extend throughout the length of the mold and blanket members 120 and 121 so that same may be laid back to either side of the mold for the insertion of the mold 103 and its attached article 104. When same have been inserted, the flaps or pieces 120 and 121 are laid over the top thereof and the closures 3 and 4 are drawn together by means of the slide fastener as previously described. It will be understood that the flexibility of the fastener or closure means 3 or 4 permits a continuity of the flexible and pliable nature of the members 120 and 121 throughout their length so that same will conform even along the edges of the closure to the surfaces to be molded therewithin. Thus a completely tight and accurate fitting of the membranes is assured throughout the length of the bag or membrane means, while a completely fluid-tight closure is effected in a position most convenient for insertion and removal of the mold or articles to be molded. The work need not be dragged along in contact with the blanket or membrane during the closing and fitting operations nor will the blanket or membrane be dragged or brought in contact with the floor or other surfaces while putting the assembly in the autoclave for heating and application of pressure. The minimum surface and quantity of material for the fluid-tight membrane is provided by this and the first form of the invention described while a minimum of handling thereof is entailed in both cases.

Referring to the form of the invention shown in Fig. 3, same is there shown as applied to a baglike membrane which is wrapped around or completely envelopes the mold and article to be molded, as in Fig. 2 of said Vidal patent, for example. In this form the male mold 130 is positioned with the materials 131 to be molded thereabout and this assembly is surrounded by a bag or membrane comprising a continuous blanket 135 which, as shown, completely envelopes the mold and article. The closure of said bag or envelope is effected by the closure members 3 and 4 provided throughout the length of the opening or mouth of said bag, said opening and closure members preferably extending throughout the length of said bag. Here again the minimum amount of blanket or membrane material is required to completely envelope the mold and article and same may be drawn tightly into conformity therewith by the act of closing the bag as already described.

The invention in its broader aspects is not limited to the specific mechanisms shown and described but departures may be made therefrom within the scope of the accompanying claims without departing from the principles of the invention and without sacrificing its chief advantages.

What I claim is:

1. In fluid pressure molding apparatus in combination, a mold curved in at least two directions and adapted to have material to be molded in contact therewith, a flexible fluid-impervious membrane positioned to cover said mold and material, the membrane being shaped and sized to conform closely to said mold and material, means for subjecting the face of the membrane remote from the mold and material to fluid pressure and means for venting the opposite face thereof to a lower pressure, and an opening in said membrane, the edges of said opening being formed as flexible mating strips of yieldable material, and a slide member for joining said strips in a fluid-tight closure, said closure being substantially coextensive with one of the major axial dimensions of the mold.

2. In fluid pressure molding apparatus in combination, a curved mold adapted to have material to be molded in contact therewith, a flexible fluid-impervious bag for enclosing said mold and material, said bag being shaped and sized to conform closely to the mold and material therewithin, means for subjecting the face of the bag remote from the mold and material to fluid pressure, means for venting the opposite face thereof to a lower pressure, and an opening in said bag substantially coextensive with one of the major axial dimensions of the mold, the edges of said opening being formed as flexible mating strips of yieldable material joinable together in a fluid-tight closure, said closure being continuous throughout the length of said opening and flexibly movable with the walls of the bag in respect to the mold.

HANS G. MORNER.